Oct. 9, 1945.　　　　W. P. MUNK　　　　2,386,564
OIL AND GAS SEPARATOR
Filed June 9, 1941

William Paul Munk
INVENTOR.

Patented Oct. 9, 1945

2,386,564

UNITED STATES PATENT OFFICE 2,386,564

OIL AND GAS SEPARATOR

William Paul Munk, San Francisco, Calif.

Application June 9, 1941, Serial No. 397,272

10 Claims. (Cl. 103—203)

This invention relates to oil and gas separators for use in combination with pumps in oil wells.

A primary object of this invention is to provide oil and gas separators that are simple in construction yet effective in operation.

Another object of this invention is to provide, in oil and gas separators of the type employing a down-pass space for oil and gas separation and an up-pass space for pump fluid, a construction that avoids the use of pipes in the down-pass space, to provide a full-transverse-area down-pass space and yet eliminate turbulence and gas locking and provide orderly separation action.

A further object of this invention is to provide a down-pass oil and gas separation space, in oil and gas separators of the type having the down-pass oil and gas separation space at the top of the pumping instrumentality, of a transverse area favorably comparable with that of oil and gas separators having the down-pass oil and gas separation space positioned below the pumping instrumentality.

And a further object of this invention is to provide a construction with oil and gas separators, having the down-pass oil and gas separation space positioned at the top of the pumping instrumentality, means to eliminate flexing of the pumping instrumentality, during imposition of lateral load in off-vertical wells, that would hasten wearing out of the pumping instrumentality.

Other objects and advantages of my invention will appear as the specification proceeds.

For a better understanding of my invention, reference should be had to the accompanying drawing, in which.

Figures 1, 2, 3, 4:
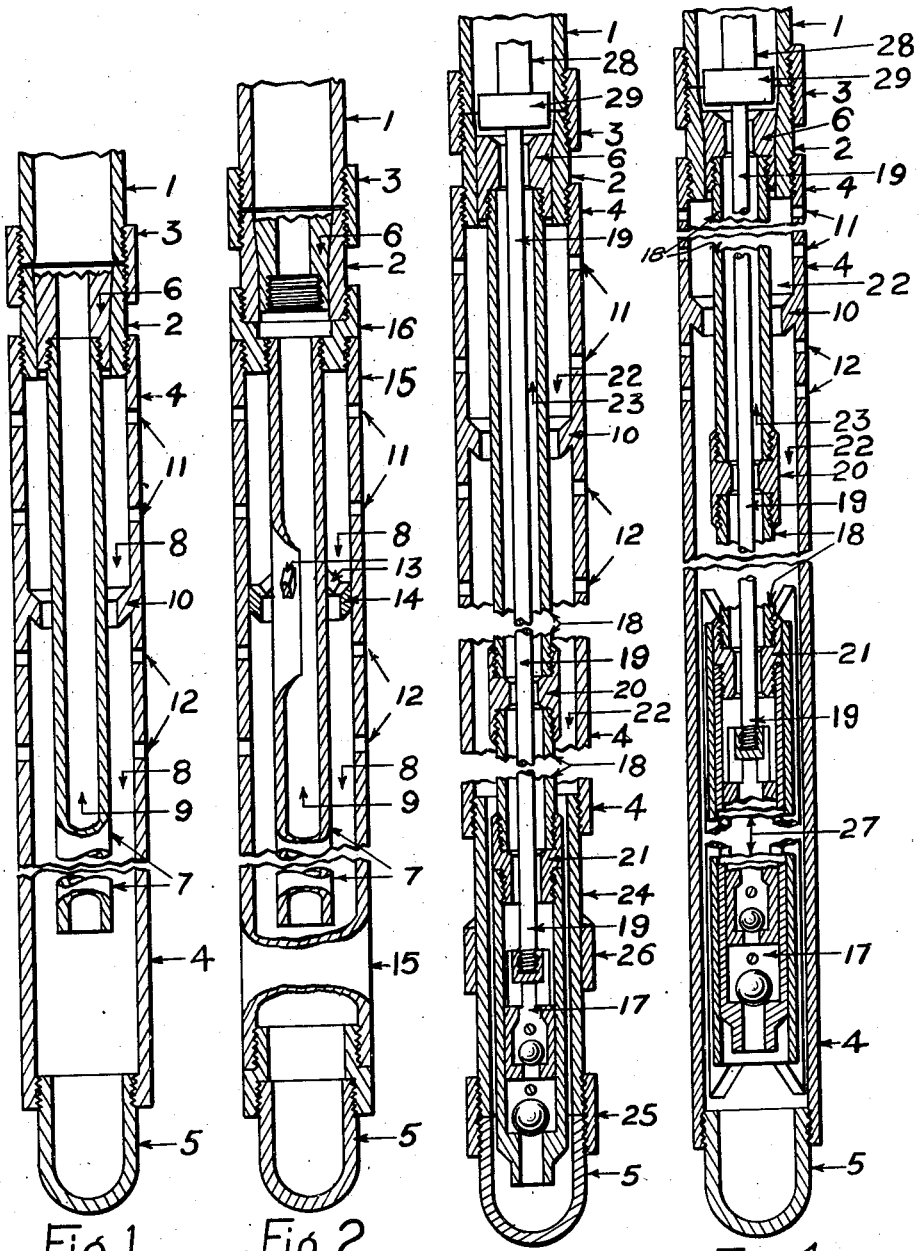
Figure 1 is a vertical sectional view illustrating one form of my improved oil and gas separator.
Figure 2 is a vertical sectional view illustrating a modified form of my improved oil and gas separator.
Figure 3 is a vertical sectional view illustrating another form of my improved oil and gas separator.
Figure 4 is a vertical sectional view illustrating still another form of my improved oil and gas separator.

In Figure 1:

1 is a fragmentary portion of the usual well tubing or eduction pipe.

2 is a shoe attached to the lower end of the tubing 1 by the usual tubing coupling 3.

4 is a separator barrel having internal threads at its upper and lower ends. The upper threads secure the separator barrel 4 to the shoe 2, while the lower threads receive the plug 5.

6 is a hold down for a standing valve or a pump and attached thereto and suspended therefrom is a flow pipe 7.

Flow pipe 7 forms the down-pass space 8 for oil and gas separation and also the up-pass space 9 for pump fluid, all within the barrel 4.

10 is a baffle plate in the down-pass space 8 and attached to the inner wall of the separator barrel 4.

11 and 12 are openings or perforations, through the separator barrel 4 above and below the baffle plate 10, serving to communicate the well and the down-pass space 8.

In action, fluid or oil and gas entrained in the oil enters through perforations 11 into the upper section of down-pass space 8. Separation of gas and oil occurs and gas vents through the uppermost of the perforations 11 and back to the well, eventually to pass up between the well tubing 1 and the usual casing (not shown) about well tubing 1 and out the head (not shown). The specific gravity of the fluid in this space has been changed, due to separation of gas from the oil and venting of the gas, and, the fluid being now heavier, flows downward in this space 8. Baffle plate 10 directs the fluid and causes it to flow downward on the outer wall of the flow pipe 7. Simultaneously fluid enters through the uppermost of the perforations 12 and into the lower section of down-pass 8 to join with and be carried downward by the fluid flowing downward on the outer wall of pipe 7. During this downward movement of the fluid on the outer wall of the flow pipe 7 the oil clings to the outer wall of the flow pipe 7 and the gas, being lighter or of less specific gravity than the oil, separates to the outer side of the film of fluid flowing downward on the outer wall of flow pipe 7. Downward movement of the film of fluid continues and the oil enters the down-pass space 8 below the lowermost of the perforations 12 while the gas is displaced through the lowermost of the perforations 12 and is vented back to the well. Because of the action just described it will be readily seen that gas locking in the lower section of the down-pass space 8 is avoided. And further, because of the baffle plate construction entrance of fluid from the well through perforations 12 and into the down-pass space 8 and venting of gas through perforations 12 and back to the well are thus facilitated, for the reason that there is no relatively thick film of oil, as in ordinary anchors or separators, flowing downward on the inner wall of the separator barrel 4 and through which incoming fluid and outgoing gas would have to pass during the separating operation.

The baffle plate construction also permits orderly separation of the gas from the oil, avoids turbulence and also eliminates gas locking. This is so by reason of the fluid coursing downward on the outer wall of the flow pipe 7, as disclosed earlier herein, so that gas, such as may still be entrained in the oil and ready for further separation from the oil and venting back to the well, is positioned between the heavier fluid coursing downward on the outer wall of the flow pipe 7 and the separator barrel 4, and therefore is free—there being no relatively thick obstructive film of oil on the inner wall of the separator barrel 4—to move through the perforations 12 and back to the well. This construction eliminates the use of pipes in the down-pass space 8 and thereby permits a full transverse-area down-pass space required for the satisfactory handling of large volumes of gassy fluid.

In Figure 2:

The drawing illustrates an inserted baffle plate separator. Lateral extensions 13 attached to the flow pipe 7 attach the baffle plate 14 (all by welding) to the flow pipe 7, thus acting to hold the baffle plate 14 in proper position in the separator barrel 15. Unscrewing of the inserted top collar 16 enables the flow pipe 7 and the attached baffle plate 14 to be withdrawn from the separator barrel 15, for the purpose of cleaning, should this be required. This construction also serves to centralize the flow pipe 7 in the separator barrel 15.

If desired flow pipe 7 may be welded to collar 16, which in turn may be welded to barrel 15, and likewise baffle plate 14 may be welded onto barrel 15 to provide an integral separator construction.

In Figure 3:

The drawing illustrates the use of my invention with top-of-the-pump type separators, the separator barrel construction remaining the same as that illustrated in the Figure 1. In this separator the barrel 4 is positioned between the top of the pumping instrumentality 17 and the bottom of the shoe 2. The pumping instrumentality 17 suspends from a tubular assembly comprised of tubes 18, of substantially equal lengths and of relatively less outer diameter than the pumping instrumentality 17, and the coupling 20 about the tubes 18, which tubular assembly in turn suspends from the hold down 6. The pump rod 19 extending through the tubular assembly serves to actuate the pumping instrumentality 17. Coupling 20 about tubes 18 and the hold down 6 and also the coupling 21 at the top of the pumping instrumentality 17 are of less inner diameter than the tubes 18 and prevent the pump rod 19 from wearing holes in the tubes 18 that would cause their failure.

Under certain conditions it may be desirable to provide a tubular assembly having but one long tube only between the hold down 6 and the pumping instrumentality 17, instead of the two short tubes 18 and the coupling 20. In this case an alloyed metallic anti-wear ring retained in the mid-portion of the single tube by welding may be substituted for the coupling 20.

A down-pass space 22 for oil and gas separation, of a transverse area favorably comparable with that of the bottom-of-the-pump type separators (space 8, Figures 1 and 2), is thus formed and an up-pass space 23, for pump fluid, ample in transverse area, is formed between pump rod 19, tubes 18, and members 21, 20 and 6.

A joint of tubing or a jacket 24 (of inner diameters less than the inner diameter of barrel 4) attaches to the bottom of the separator barrel 4 and terminates at its lower end with the coupling 25 and the plug 5. The jacket 24, the coupling 25, the plug 5, the pumping instrumentality 17 and the coupling 21 form a passage for fluid to go from the oil and gas separation space 22 into the pumping instrumentality 17. Collar 26 about jacket 24, of the same outer diameter as coupling 3, separator barrel 4, and coupling 25, enable the well casing (not shown) to support the jacket so that the jacket in turn can support the pumping instrumentality 17, when subjected to lateral load in off-vertical wells, to prevent flexing of the pumping instrumentality 17, which would hasten its wearing out.

By raising of the rod 19 beyond the normal reciprocal range of the pumping instrumentality 17, the plunger with the pumping instrumentality engages coupling 21 and pulls the assembled parts or hold down 6, tube 18, coupling 21, and the pumping instrumentality 17 from the tubing, for the purpose of repair or replacement. The baffle plate construction 10 in no way interferes with this operation.

In Figure 4:

The barrel 4 has been lengthened. Cradle 27 in barrel 4 and about the pumping instrumentality 17 forms a passage, of greater transverse area than that of the plunger with pumping instrumentality 17, for fluid to go from the oil and gas separation space 22 into pumping instrumentality 17.

Because of the full outer diameter of barrel 4 (as compared to tubing coupling 3) the barrel 4 receives support from the well casing (not shown) and with cradle 27 enables the pumping instrumentality 17 to be centralized in barrel 4 and also to be supported when subjected to lateral load in off-vertical wells, to prevent flexing of the pumping instrumentality 17, which would hasten its wearing out.

The cradle 27, as shown in Figure 4, is retained in the barrel 4 by welding; however, if desired, the cradle may be made insertable and withdrawable from the barrel 4, the plug 5 acting to retain the said last mentioned type of cradle in barrel 4.

The guide 29 acts to centralize the pump rod 19 in the well tubing 1 and 28 acts to couple the usual rod (not shown) which extends to the ground surface and is provided to actuate the pumping instrumentality.

While I have shown but one baffle plate with each of the separators illustrated in the various figures, I wish that it be understood that more than one baffle plate may be employed to improve the all around efficiency of the separators. It will be noted that with one baffle plate but two perforated barrel sections (barrel sections having perforations 11 and 12) are employed; however, if two baffle plates are employed three perforated barrel sections will be required and if three baffle plates are employed four perforated barrel sections will be required, etc.

The invention is susceptible to changes and variations and this may be done without departing from the spirit of the invention.

Attention is directed to my co-pending Patent 2,339,748, January 18, 1944, in which pump structure is shown comprising: a pump column in the casing of a well; a closure at the lower end of the pump column; a pumping instrumentality in the pump column above the closure; an oil and gas separation chamber in the pump column and substantially above the working pump space in the pumping instrumentality; a passage between the pumping instrumentality and the pump column and the closure, to communicate the oil and gas separation space and the interior of the pumping instrumentality; and perforations in the pump column to communicate the oil and gas separation space and the well, whereby oil and gas are admitted from the well through the perforations and into the oil and gas separation space and gas is vented therefrom and back to the well. The above noted structure is similar to structure shown in the Figures 3 and 4 of the present application as follows: Separator barrel 4, jacket 24, plug 5, pumping instrumentality 17, oil and gas separation space 22 and perforations 11 or 12, respectively.

My Patent 2,339,748 also shows structure comprising supporting means in the pump column, in addition to retaining means for the pumping instrumentality, capable of co-acting with the retaining means to prevent misalignment of the pumping instrumentality in respect to the pump column or well tubing, and it also shows a passage, between the pumping instrumentality and the supporting means and the pump column and the closure, for communicating the above mentioned oil and gas separation chamber and the interior of the pumping instrumentality. Similarly the present application has the shoe 2, the hold down 6, the cradle 27 and the passage between the cradle 27 and the separator barrel and the pumping instrumentality and the plug 5 (see Figure 4 of the present application).

What is claimed is:

1. A deep well oil and gas separator, comprising: a separator barrel; means providing a wall in said separator barrel and capable of cooperating with said separator barrel to form a down-pass space for separation of gas from oil; means in said separator barrel and adapted to form an up-pass space for pump fluid; a baffle in said down-pass space and adapted to divide said down-pass space into upper and lower sections; means providing a passage placing the bottom of the upper section of said down-pass space in communication with the top of the lower section of said down-pass space; openings in said separator barrel above and below said baffle, said openings placing the upper and the lower sections of said down-pass space in communication with the space exterior to said separator barrel; and the improvement which comprises having said passage adapted to direct fluid from the upper section of said down-pass space downwardly onto said wall in the upper portion of the lower section of said down-pass space so as to enable flow of such fluid downwardly on said wall in the upper portion of the lower section of said down-pass space and so as to substantially avoid flow of such fluid downwardly on the inner wall of said separator barrel between said baffle and the lowermost of said openings in said separator barrel.

2. A deep well oil and gas separator, comprising: a separator barrel; a tube in said separator barrel; a down-pass space for separation of gas from oil and located between said tube and said separator barrel; an up-pass space for pump fluid and located in said tube; an annular baffle plate in said down-pass space and adapted to cooperate with said separator barrel to divide said down-pass space into upper and lower sections and spaced from said tube to provide an annular passage between said baffle plate and said tube, said annular passage placing the bottom of the upper section of said down-pass space in communication with the top of the lower section of said down-pass space, and said annular passage also cooperating with said baffle plate whereby fluid moving downwardly from the upper section of said down-pass space is directed onto the outer wall of the portion of said tube in the upper portion of the lower section of said down-pass space; and openings in said separator barrel above and below said baffle plate, said openings placing the upper and the lower sections of said down-pass space in communication with the space exterior to said separator barrel.

3. A deep well oil and gas separator, comprising: a separator barrel; a tube in said separator barrel; a down-pass space for separation of gas from oil and located between said tube and said separator barrel; an up-pass space for pump fluid and positioned in said tube; an annular baffle plate in said down-pass space and adapted to divide said down-pass space into upper and lower sections and spaced from said tube to provide a passage placing the bottom of the upper section of said down-pass space in communication with the top of the lower section of said down-pass space in such manner as to enable fluid, moving downwardly from the upper section of said down-pass space, to be directed substantially circumferentially onto the outer wall of said tube in the upper portion of the lower section of said down-pass space; openings in said separator barrel above and below said baffle plate, said openings placing the upper and the lower sections of said down-pass space in communication with the space exterior to said separator barrel and means on said baffle plate adapted to centralize said tube in respect to said separator barrel.

4. In combination with a well tubing having a shoe, an oil and gas separator, comprising: a separator barrel secured at its upper end to said shoe and having a closure at its lower end; an inserted pump having a hold down in said shoe, a pumping instrumentality in said separator barrel, an open-ended tube intermediately between and connecting said pumping instrumentality to said hold down, a rod to actuate said pumping instrumentality and extending from said pumping instrumentality upwardly through said open-ended tube and through said hold down, means with said open-ended tube and adapted to prevent wear of said open-ended tube by said rod during the actuation of said pumping instrumentality, and an up-pass space for pump fluid and located in said inserted pump; a down-pass space for separation of gas from oil and positioned between said shoe and said inserted pump and said separator barrel; openings in said separator barrel about said open-ended tube, said openings placing said down-pass space in communication with the space exterior to said separator barrel; and the improvement which comprises having said open-ended tube of relatively less outer diameter than said pumping instrumentality whereby an increase in transverse area of that portion of said down-pass space between said separator barrel and said open-ended tube is secured.

5. In combination with a well tubing, an oil and gas separator, comprising: a separator barrel secured to the lower end of said well tubing and having a closure at its lower end; a pump assembly having retaining means at the lower end of said well tubing to hold said pump assembly in said separator barrel, a pumping instrumentality in said separator barrel, an open-ended tube intermediately between and connecting said pumping instrumentality to said retaining means, a rod to actuate said pumping instrumentality and extending from said pumping instrumentality upwardly through said open-ended tube and through said retaining means, and an up-pass space for pump fluid and located in said pump assembly; a down-pass space for separation of gas from oil and positioned between said pump assembly and said separator barrel; openings in said separator barrel about said open-ended tube, said openings placing said down-pass space in communication with the space exterior to said separator barrel; and the improvement which comprises having said open-ended tube of relatively less outer diameter than said pumping instrumentality whereby an increase in transverse area of that portion of said down-pass space between said separator barrel and said open-ended tube is secured.

6. In combination with a well tubing, an oil and gas separator, comprising: a separator barrel of substantially the same outer diameter as said well tubing and secured to the lower end of said well tubing and having a closure at its lower end; a pump assembly having retaining means at the lower end of said well tubing to hold said pump assembly in said separator barrel, a pumping instrumentality in said separator barrel, an open-ended tube intermediately between and connecting said pumping instrumentality to said retaining means, a rod to actuate said pumping instrumentality and extending from said pumping instrumentality upwardly through said open-ended tube and through said retaining means, and an up-pass space for pump fluid and located in said pump assembly; and the improvement which comprises having supporting means between said pumping instrumentality and said separator barrel, said supporting means being capable of coacting with said retaining means to substantially prevent misalignment of said pumping instrumentality and said open-ended tube in respect to said separator barrel, a down-pass space for separation of gas from oil and positioned between said retaining means and said supporting means and between those portions of said pump assembly and said separator barrel between said retaining means and said supporting means, a passage between said pumping instrumentality and said supporting means and said separator barrel and said closure, said passage placing said down-pass space in communication with the interior of said pumping instrumentality, and openings in said separator barrel about said down-pass space, said openings placing said down-pass space in communication with the space exterior to said separator barrel.

7. In combination with a well tubing, an oil and gas separator, comprising: a separator barrel of substantially the same outer diameter as said well tubing and secured to the lower end of said well tubing and having a closure at its lower end; a pump assembly having retaining means at the lower end of said well tubing to hold said pump assembly in said separator barrel, a pumping instrumentality in said separator barrel, an open-ended tube intermediately between and connecting said pumping instrumentality to said retaining means, a rod to actuate said pumping instrumentality and extending from said pumping instrumentality upwardly through said open-ended tube and through said retaining means, and an up-pass space for pump fluid and located in said pump assembly; and the improvement which comprises having supporting means between said pumping instrumentality and said separator barrel, said supporting means being capable of coacting with said retaining means to substantially prevent misalignment of said pumping instrumentality and said open-ended tube in respect to said separator barrel, a down-pass space for separation of gas from oil and positioned between said open-ended tube and said separator barrel and said retaining means and said supporting means and said pumping instrumentality, a passage between said pumping instrumentality and said supporting means and said separator barrel and said closure, said passage placing said down-pass space in communication with the interior of said pumping instrumentality, and openings in said separator barrel about said open-ended tube, said openings placing said down-pass space in communication with the space exterior to said separator barrel, and having said open-ended tube of relatively less outer diameter than said pumping instrumentality whereby an increase in transverse area of said down-pass space is secured.

8. In combination with a well tubing, an oil and gas separator, comprising: a separator barrel secured to the lower end of said well tubing and having a closure at its lower end; a pump assembly having retaining means at the lower end of said well tubing to hold said pump assembly in said separator barrel, a pumping instrumentality in said separator barrel, an open-ended tube intermediately between and connecting said pumping instrumentality to said retaining means, a rod to actuate said pumping instrumentality and extending from said pumping instrumentality upwardly through said open-ended tube and through said retaining means, and an up-pass space for pump fluid and located in said pump assembly; a down-pass space for separation of gas from oil and positioned between said pump assembly and said separator barrel; and the improvement which comprises having said open-ended tube of relatively less outer diameter than said pumping instrumentality whereby an increase in transverse area of that portion of said down-pass space between said separator barrel and said open-ended tube is secured, an annular baffle plate in that portion of said down-pass space between said separator barrel and said open-ended tube and adapted to cooperate with said separator barrel to divide such portion of said down-pass space into upper and lower sections and also spaced from said open-ended tube to provide an annular passage between said baffle plate and said open-ended tube, said annular passage placing the bottom of the upper section of said down-pass space in communication with the top of the lower section of said down-pass space, and openings in said separator barrel above and below said baffle plate, said openings placing the upper and the lower sections of said down-pass space in communication with the space exterior to said separator barrel.

9. In combination with a well tubing, an oil and gas separtor, comprising: a separator barrel of substantially the same outer diameter as said well tubing and secured to the lower end of said well tubing and having a closure at its lower end; a pump spacedly positioned in said separator barrel; retaining means at the lower end of said well tubing and secured to the upper end of said pump and holding said pump in said separator barrel; a rod to actuate said pump; an up-pass space for pump fluid and located in said pump; and the improvement which comprises having a pipe included with said separator barrel and of relatively less inner diameter than said separator barrel and making a loose fitting non-sealing fit with and surrounding said pump and capable of co-acting with said retaining means to substantially prevent misalignment of said pump in respect to said separator barrel, a down-pass space for separation of gas from oil and positioned between said pump and said retaining means and said separator barrel and said pipe, openings in said separator barrel about said down-pass space, said openings placing said down-pass space in communication with the space exterior to said separator barrel, and a passage between said pump and said pipe and said closure, said passage placing said down-pass space in communication with the interior of said pump.

10. In combination with a well tubing, an oil and gas separator, comprising: a separator barrel of substantially the same outer diameter as said well tubing and secured to the lower end of said well tubing and having a closure at its lower end; a pump assembly having retaining means at the lower end of said well tubing to hold said pump assembly in said separator barrel, a pumping instrumentality spacedly positioned in said separator barrel, an open-ended tube intermediately between and connecting said pumping instrumentality to said retaining means, a rod to actuate said pumping instrumentality and extending from said pumping instrumentality upwardly through said open-ended tube and through said retaining means, and an up-pass space for pump fluid and located in said pump assembly; and the improvement which comprises having a pipe included with said separator barrel and of relatively less inner diameter than said separator barrel and making a loose fitting non-sealing fit with and surrounding said pumping instrumentality and adapted to co-act with said retaining means to substantially prevent misalignment of said pumping instrumentality and said open-ended tube in respect to said separator barrel, a down-pass space for separation of gas from oil and located between said open-ended tube and said retaining means and said separator barrel and said pipe, openings in said separator barrel about said down-pass space, said openings placing said down-pass space in communication with the space exterior to said separator barrel, and a passage between said pumping instrumentality and said pipe and said closure, said passage placing said down-pass space in communication with the interior of said pumping instrumentality.

WILLIAM PAUL MUNK.